United States Patent
Rossiter

(10) Patent No.: US 7,594,951 B2
(45) Date of Patent: Sep. 29, 2009

(54) PROCESS FOR ENGINEERED ION EXCHANGE RECOVERY OF COPPER AND NICKEL

(76) Inventor: Gordon Rossiter, 6342 Butternut Dr., Lakeland, FL (US) 33813-3679

( * ) Notice: Subject to any disclaimer, the term of this patent is extended or adjusted under 35 U.S.C. 154(b) by 378 days.

(21) Appl. No.: 11/297,617

(22) Filed: Dec. 7, 2005

(65) Prior Publication Data

US 2007/0125198 A1 Jun. 7, 2007

(51) Int. Cl.
*C22B 15/00* (2006.01)
(52) U.S. Cl. .............................. 75/714; 75/718; 75/726
(58) Field of Classification Search .................. 75/714, 75/718, 726
See application file for complete search history.

(56) References Cited

U.S. PATENT DOCUMENTS 3,951,649 A * 4/1976 Kieswetter et al. ............ 75/740
4,197,117 A * 4/1980 Pemsler et al. ................ 75/740

FOREIGN PATENT DOCUMENTS

WO WO 02/30570 4/2002
WO WO2004/029490 4/2004

OTHER PUBLICATIONS

Copper Recovery from Leach Liquors using Continuous Ion Exchange, Randol Conference, Vancouver 1998, Rossiter, Gordon J.; Carey, Kenneth C.

* cited by examiner

*Primary Examiner*—Roy King
*Assistant Examiner*—Jie Yang
(74) *Attorney, Agent, or Firm*—Curtis L. Harrington; Kathy E. Harrington; Harrington & Harrington

(57) ABSTRACT

A method for extracting and concentrating copper values from copper-I leach liquors that are economically non-viable using conventional SX-EW or known conventional configurations of IX. The novel process scheme is compatible and advantageous for use with a multi-port valve CIX system, a suitable membrane separation system and a selective scrubbing technique to control iron.

19 Claims, 2 Drawing Sheets

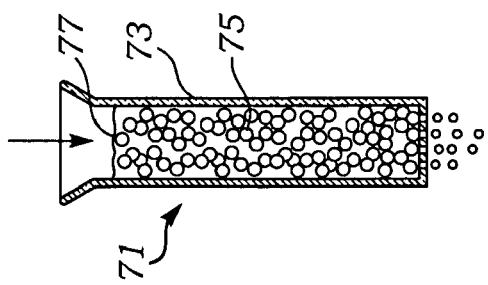
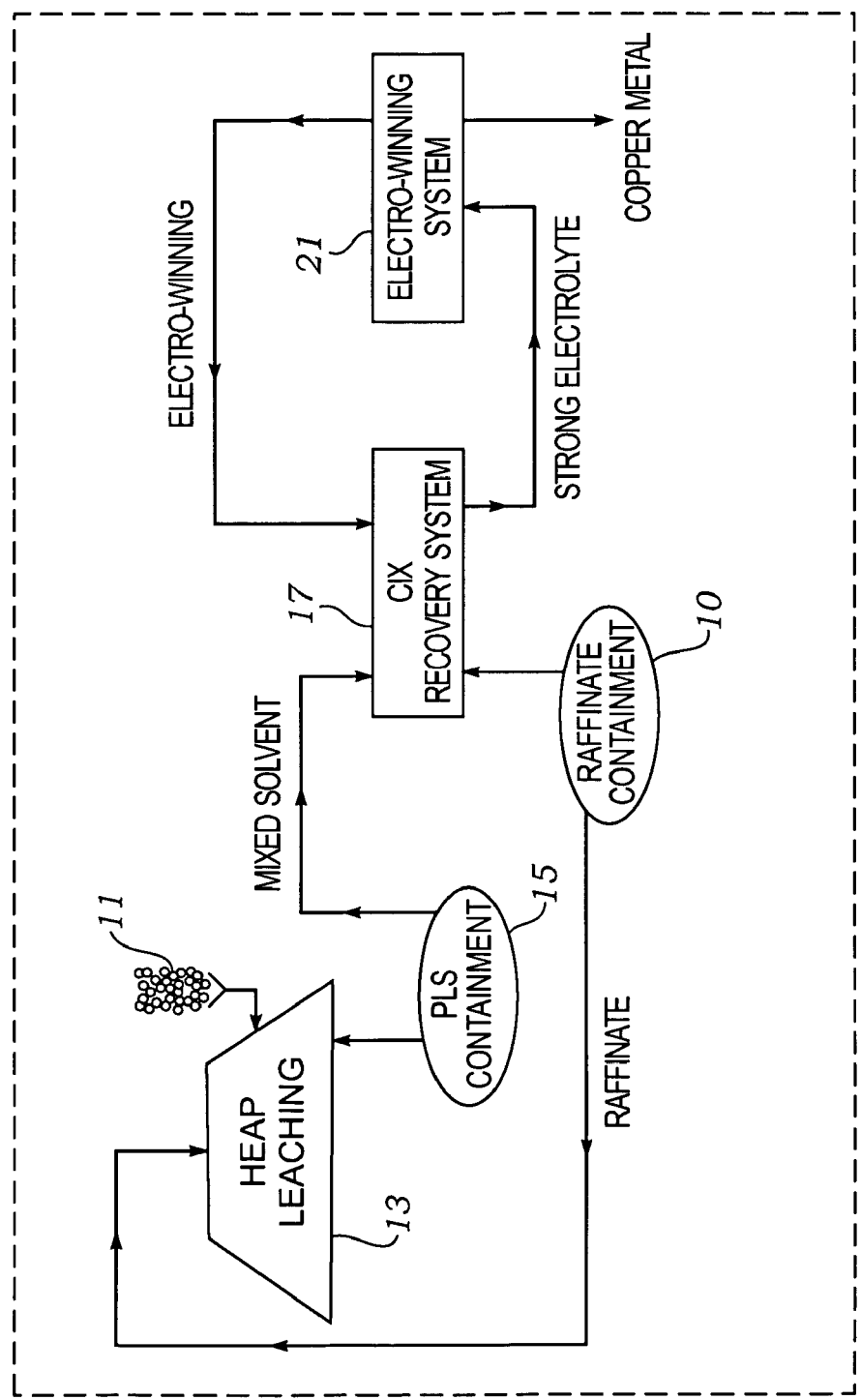

PROCESS FOR ENGINEERED ION EXCHANGE RECOVERY OF COPPER AND NICKEL

BACKGROUND OF THE INVENTION

The present invention relates to a process of copper recovery using an ion exchange resin, and more particularly one which will allow 100% recovery of copper from an acid process stream while neither utilizing more than negligible water uptake nor producing any water borne metal laden waste, by stoichiometrically balancing the water between the absorption, elution and wash. The invention also can also be utilized to increase the recovery of copper and other metals such as zinc and nickel in existing process environments.

In terms of the history of copper recovery generally, in the late 1960s and into the 1970s began the rise of a process called SX-EW (Solvent Extraction Electro-Winning) for the recovery of copper from soluble copper ore leachates. This technique has evolved to permit recovery of copper, of London Metal Exchange grade, from large heap leach operations producing copper pregnant leach solutions (PLS) in the range of 1-6 grams of copper in a liter of PLS. The economics of the SX process, since it is based upon an equilibrium, favor the use of higher solution grades as a copper input stream. When solution copper levels drop below 1 gram per liter SX economics become distinctively less attractive.

One reason that the investment and operating economics deteriorate with lower PLS grades results from the inherent design of the SX systems. The size of the SX plant is a function of the phase disengagement rates between the solvent and the aqueous liquids. This size is therefore a function of volumetric flow rate and is limited in its efficiency by the liquid contact and mixing, among other factors. In contrast, the size of an IX system is directly related to the kinetics of adsorption and de-sorption of the copper species and therefore is a function of the mass flow of copper production.

Further, because the SX operation has a system which depends upon a limited number (typically one or two) of equilibrium extraction stages and fails to have the potential to remove 100% of the copper, the scale of SX must tend to be large in order to be economic and the SX operation will always produce loss of copper in a waste stream. Depending upon where the copper recovery operation occurs, hazardous waste necessarily is created. CIX in contrast has many stages in which equivalent equilibrium contact in a short length of resin bed and can be easily configured to reduce copper in the bed effluent to very low levels to obtain high recoveries in a single operation.

Despite the inherent advantage of CIX in terms of extraction efficiency, conventional continuous ion exchange (CIX) still suffers several major obstacles, and a discussion and illustration of these problems will be aided by a discussion of the state of the art of aspects of the best known CIX system. Although the processes described in the prior art and the invention will be couched in terms of copper generally, the overall process can be used with other metals which are subject to being treated with the same processes. In terms of an overall mine process, crushed ore is contacted with an acidic aqueous solution which causes the copper in the ore to form a soluble copper solution. The soluble, acidic aqueous copper solution is allowed to contact an ion exchange resin, commonly reported in the literature as XFS 4195/4196/43084 which is commercially available from DOW Chemical Company, Liquid Separations, P.O. Box 1206 Midland, Mich. 46842-1206 under the DOWEX trademark. The geometry into which these resin ion exchange materials are placed can vary widely based upon the expected flow rates, regeneration requirements (both timing and flow).

Details of the operation of the above resins are given in a paper entitled "Copper Selective Ion Exchange Resin with Improved Iron Rejection", Journal of Metals Vol 31, No 3, 1979, R. R. Grinstead, Dow Chemical USA.

The performance of the resins are given in an article entitled "Copper Recovery from Leach Liquors using Continuous Ion Exchange", Randol Conference, Vancouver 1998, Rossiter, Gordon J.; Carey, Kenneth C. As described therein, one of the peculiarities of utilizing a column of the types described above is the column's affinity for trapping iron, if only momentarily, before the column is fully selectively loaded with copper. As a result, the basic column operation includes loading with a copper stream (which may contain iron), while (1) fully loading the bed with a pure copper stream to displace any iron which may have been attracted onto sites not fully saturated with copper, or (2) possibly introducing a dilute acid stream dosed with $SO_2$ to remove impurities and reduce any $Fe^{3+}$ to $Fe^{2+}$, the latter ionic species having a lesser affinity for the resin sites.

Since the Fe is displaced by the copper during a column's normal activity, any residual Fe buildup is at the downstream flow site and so the scrub process is accomplished with flow in the same direction as that in which copper absorption operation occurred. The scrub reduces the residual Fe on the resin to a lesser percentage of the total Fe which was originally absorbed along with the copper.

The beginning of the copper stripping step also quickly elutes the remaining Fe (the lesser percentage) still present on the resin after the scrub operation into the first volume of stripping electrolyte used. Only a small amount of copper is lost in this first volume of stripping electrolyte and the remainder of the stripping electrolyte essentially completely removes the remainder of the copper. Stripping uses 70-200 grams per liter $H_2SO_4$, can be done with one bed void volume but is more complete with two.

The overall process described includes a copper/iron feed inlet stream (PLS), a depleted copper/iron raffinate exit stream, a spent electrolyte inlet stream which is a adequate to absorb copper during stripping, and the strong electrolyte exit stream carrying the copper product from the stripped column.

However, the Rossiter system proposed in the 1998 paper proposed a continuous scheme yet failed to solve the issue of the water balance, complete copper recovery and closed loop operation clearly.

In a summary of the state of the art for copper extraction from leach solutions, Alan A. Taylor, in his article entitled "Copper SX/EW Any Rivals in Sight Alta Metallurgical Services", February 2002", mentions the potential of IX for the future but only considers IX as a pre-concentration technique to boost the concentration of the process stream.

Jones and Pyper along with Grinstead of Dow Chemical worked in the 1970s and early 1980s developing resin based materials and IX techniques for copper recovery. A number of publications resulted, including "Recovery of Non-Ferrous Metals from Acidic liquors with a Chelate Exchange Resin in the Presence of Iron(III)", U.S. Pat. No. 3,998,924, Dec. 21, 1976, Jones, Kenneth C. and Wheaton, Robert M.; "Copper Recovery from Acidic Leach Liquors by Continuous ion-Exchange and Electrowinning", Journal of Metals, Vol 31. No. 4, April 1979, pp. 19-25, Jones, Kenneth C., Pyper, Randall A.; and "Extraction of Copper, Nickel and Cobalt using Alkyl Aromatic Sulfonic Acids and Chelating Amines", U.S. Pat. No. 4,254,087, Mar. 3, 1981, Grinstead, Robert R.

Since then there has been little commercial effort to implement IX as a primary process for concentrating and purifying copper from leach solutions.

In summary existing technology still faces major obstacles to an effective, economic and environmentally friendly process using CIX (Continuous Ion Exchange) for copper recovery from leach solution. The main problem areas which have yet to be solved include:

(1) Water availability and consumption associated with resin wash/scrub and rinsing operations. Problems in the water balance drive other problems and include (a) a build-up in water used for the leaching operation causes excess use of acid and a resulting disadvantageous dilution of copper leach concentration (which can be a severe problem in areas where rainfall is an issue in maintaining a volume balance around the leach circuit); (b) the need for extra evaporation equipment to remove the excess water from the leaching operation circuit; (c) excess water in the electrolyte which necessitates an excessive bleed of electrolyte and resulting copper and other electrolyte component losses and (d) the expense involved in generating wash/rinse waters in desert climates and the cost of treating such waters to remove undesirable mineral impurities;

(2) Inability to hold a constant volume balance in the resin elution electro-winning circuit;

(3) Maintaining a Cu:Fe ratio of metals (purity) transferred into the electrolyte similar to that obtained by SX processes;

(4) Overcoming the costs associated with maintaining a large inventory volume of resin; and (5) Unfavorable economics associated with the use of other chemicals and chemical systems to reduce feed iron levels.

What is needed is an invention which can overcome the above limitations and shortcomings to enable control and recovery of all the copper, combined with a more environmentally friendly mode of operation. The needed system should be compatible with a multi-port valve CIX system in order to facilitate automatic operation and monitoring. The needed system should be compatible with commercially available membrane technology (nano-filtration) and iron reduction techniques to solve the above problems.

SUMMARY OF THE INVENTION

The present invention relates to a method for extracting and concentrating copper values from copper leach liquors that are economically non-viable using conventional SX-EW or known conventional configurations of IX. The invention uses a novel process scheme that is compatible and advantageous for use with a multi-port valve CIX system, a suitable resin of chelating functionality and selective for copper at low pH, a suitable membrane separation system and a novel selective scrubbing technique to control iron.

A membrane system can be used to produce wash and rinse solutions from the raffinate or feed streams and the product solutions. Suitable membranes for this purpose are described in the paper "Membrane Plant for Preconcentration of PLS", AIME Spring meeting Cananea 1997, Harrison Western Process Technologies, Denver Colo. These membranes are engineered by Desal Osmonics, a division of GE Water & Process Technologies.

Resins employable for this invention include all those that selectively load copper (or nickel) under acidic conditions in the range, 0.8<pH<2.5. (Examples of these are Dowex 43084, Dowex 4195, CuWRAM (Purity Systems Inc.), TP 207 (Lanxess) and various solvent impregnated resins.) It is preferred to use adsorbents beads or particles with mean sizes in the range 100 microns to 700 microns.

BRIEF DESCRIPTION OF THE DRAWINGS

The invention, its configuration, construction, and operation will be best further described in the following detailed description, taken in conjunction with the accompanying drawings in which:

FIG. 1 shows an overall diagram showing the general heap leach, extraction, metal recovery process;

FIG. 2 is a schematic view of a single packed column containing adsorbent ion-exchange resin beads;

DETAILED DESCRIPTION OF THE INVENTION

Figure 3:
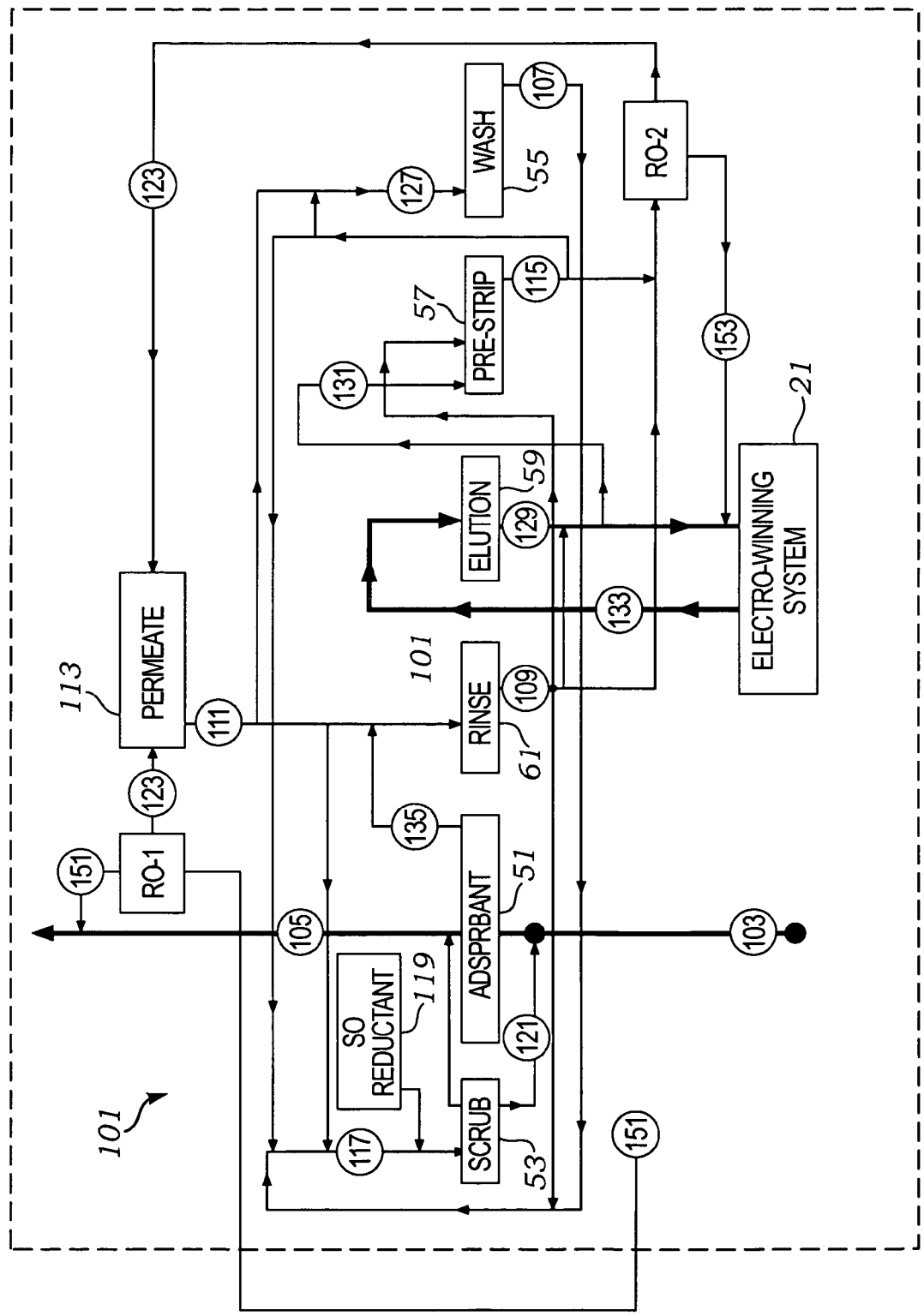
FIG. 3 is a labeled process schematic showing the process stream interrelationship employing a CIX packed bed system wherein a series of packed beds are serviced by a multiple input-output valve device.

The present apparatus and method can be applied to a variety of extractive industries, but is explained in relationship to a method and apparatus of extracting and concentrating copper or nickel from acidic leach liquors.

Referring to FIG. 1 is a diagram showing the overall heap leaching to copper metal recovery system. Crushed ore 11 is introduced into a heap, dump or agitation leaching operation 13. Leach liquids contact the ore and produce a "pregnant leach solution" or PLS. The PLS is typically stored in a pond or other containment capacity storage structure, hereinafter storage 15, prior to processing in the CIX recovery operation.

From the PLS storage 15, the mixed solvent is introduced into one side of a CIX recovery system whose boundaries are identified with the numeral 17. The CIX recovery system 17 physically removes the dissolved copper from the mixed solvent and produces either a copper lean or a copper depleted raffinate stream, typically to a raffinate pond or containment structure 19. This enables the raffinate to be returned to the leaching operation 13 on an as-needed basis. In this configuration, the heap leaching operation can be performed somewhat independently of the CIX copper recovery system 17.

As will be seen, the CIX copper recovery system 17 can be operated to either remove effectively 100% of the copper from the CIX feed stream and/or remove copper selectively from other soluble impurities to produce a pure eluate stream more concentrated in copper (to be discussed). Other economic factors, operating requirements and plant layouts may effect the desired residual copper content of the raffinate.

On the other side of the copper recovery system 17 a spent electrolyte from an other operation, is introduced to elute or desorb the copper which was removed on the left side of copper recovery system 17.

To the right of the CIX copper recovery system 17, strong electrolyte containing copper metals flows to one such system, known as an electro-winning system 21. Electro-winning is commonly used in conventional copper hydro metallurgical plants and uses a spent electrolyte to take copper produced in the left side of the CIX copper recovery system 17.

From the electro-winning system 21, copper metal is produced. Once the copper metal is removed from the strong electrolyte, a spent electrolyte stream is supplied back to the CIX recovery system 17. An alternative recovery system for the copper might include a crystallization step to form copper sulfate pentahydrate crystals. Further, any of the identifiable components seen in any of the Figures can be modularized and used multiply. Modularization will help to reduce cost and will enable a more efficient processing of streams whose values could change over time.

Referring to FIG. 2, a schematic view of a column 71 is seen. Column 71 has an impermeable side wall 73 which may be glass, polymer, fiberglass, coated metal or alloy metal which is non reactive to any of the contents or liquids which may be passed through the column 71. A packed material 75 may be beads and in the description hereafter may be resin beads having an affinity for copper. An arrow illustrates the flow through the column 71, and the column 71 may have a liquid level 77 such that the packed material 75 may be always immersed in a liquid. The system description to follow may operate with one or a number of the columns 71 seen in FIG. 2. These columns may be totally enclosed vessels and operate under pressure. Liquids may flow either down through the bed or up through the bed.

Referring to FIG. 3, a detailed description of the a configuration of a copper recovery system, the details o which form the inventions contained herein. In terms of physical realizations for the equipment utilized, a multi-port valve CIX system which is highly automated is desirable. A CIX system 17 may sequence a series of packed columns through a complete ion-exchange cycle in which there are columns present which may singly or multiply occupy all stages of the cycle to be described. Typically a system having multiple columns 71 may each contain an equal amount of absorbent resin or other packed material 75. Columns 71 may be allocated to perform the various steps of a cycle in numbers and with operational times which correspond to an optimum requirement driven by concentrations, mass transfer rates, stage of contact and solution flow rates.

A more automated system can extract and concentrate copper from acidic leach liquors more efficiently and with less down time. An optimum CIX system 17 may be able to select and utilize an optimization scheme centered upon optimum amounts of adsorbent packed material 75, minimized total cycle time or other considerations. Cycle time may be defined as the time taken for a single column to complete a whole sequence of liquid contacts; i.e., the time for a column to pass completely through all of a series of contact zones and return to a starting point. As an overview to the actions which occur in the detailed flow schematic, to the copper containing mixed solvent, the overall steps are outlined as follows.

First, the copper containing feed solution mixed solvent contacts a chelating resin, selective for copper adsorption. Second, the chelating resin is reductively scrubbed with a reducing solution to remove ferric ion. Next, the resin is washed to displace residual scrub liquor from the resin beds. In some cases the wash and scrub operations can be combined into a single operation. Next, in a pre-strip stage a stream of a mixture of stripping rinse effluent solution, strong electrolyte and permeate is introduced, either as a mixture or in sequence from most dilute to least dilute in copper, to flush dilute solution and residual adsorbed Fe before the resin enters the actual elution or copper stripping step.

The column is then stripped or eluted with spent electrolyte obtained from the electro-winning system 21 seen in FIG. 1 or with strong acid, to cause the copper to be removed from the resin and to produce a strong electrolyte, essentially free of cations which is suitable to be sent directly to the electro-winning system 21 seen in FIG. 1. After elution, the resin is rinsed with permeate or in metal cation free water to displace residual strong acid eluent from the resin bed and to prepare the resin bed for another adsorption step.

The aforementioned steps can be generally accomplished using a single packed column of resin or a large rotating series of resin columns (ISEP or Septor), or a series of columns serviced by manifolds and automated valves or a group of stationary columns connected to a multi-port CIX valve (IONEX). When the latter is utilized it is possible to cross connect various streams for real time flow without the necessity of storage in small tanks, containers, or reservoirs. Achieving a multi-column, simultaneous action for a series of columns, each of which are undergoing a different stage of operation can facilitate a more "analog" based optimization which is less dependent upon precise measurements. The stepwise progression of unit operation functions in this application is intended to possibly be utilized in such a device. Common or shared flow stream usage can be had by either stationary columns operated by a slowly rotating valve element, or by a series of moving columns on a carousel which move in front of different valve openings to subject the column to a different stream. Other columns may be connected to accept or transmit flows from any other column. Utilizing this scheme can provide for a reduced need for momentary storage of streams to be used later on. Further, in terms of either timing or flows, multiple columns can experience flow within a zone in sequence to increase their residence time within the zone and to provide for a further reduction in the need for storage, and can provide some advantage in the ability to blend where necessary.

Further, other connections can be had within a zone of operations for cascading output, and may occur in countercurrent fashion, from one column into an adjacent column in the same zone. For example, where an absorptive (copper loaded) column is being eluted and where a proportion of the elution is to be used by another column, the use of a series of columns connected onto a rotary switching arrangement enables the other column to use that portion of the eluted species as soon as it is eluted and without the need for storage. Further, an external switching valve arrangement can capture the first portion of a column effluent and send it to the input of another column while a second portion can be routed to another destination.

Next, the resin is conditioned with a rinse liquor to de-acidify the column and recover residual eluted copper still present in the column after it has been moved from an elution zone into a rinse zone, for example. In addition a suitable membrane nano-filter can be used under high pressure to generate metal free scrub, wash and rinse liquors, to produce the rinse and scrub liquors by squeezing water through the membrane. The use of such suitable membrane nano-filter helps to enable a more efficient water balance and assists in eliminating the need for fresh water and the fresh water conditioning which is a pre-requisite for introduction of fresh water into the system to be described.

A first suitable membrane nano-filter may typically include a membrane system to produce some of the rinse and wash feed solutions from raffinate, or PLS seen in FIG. 1. The wash and rinse effluents may be further used as scrub liquor and may be treated in a reactor to provide a solution of sufficient reducing power to scrub the ferric ion from the resin, for example. A second suitable membrane nano-filter may typically include a membrane system to produce more rinse liquor from eluate. This second membrane nano-filter is important in maintaining a zero water balance for an electro-winning system 21 or other system, especially between the copper IX elution operation and the electrolysis step.

A third possible optional enhancement to the overall system to be described is a reactor to treat a mixture of permeate and electrolyte to be used as scrub liquor feed. One such reaction could use fine particles of copper metal in a fixed bed reactor that treats permeate for the scrub step and delivers a copper laden scrub feed at low oxidation-reduction potential.

FIG. 3 is arranged in a way to contemplate the use of a multiplicity of columns in a continuous, shared cyclic process. Each of the interconnected streams can alternatively be directed to and from a storage reservoir for current and later use, as well as for use in a continuous fashion among a set of timed, switched columns.

Referring to FIG. 3, along a horizontal band slightly below the vertical center of the Figure, a series of rectangular blocks are used to illustrate the main steps of the process, which may be a cyclic continuous ion exchange process. They are, in order of discussion ADSORPTION 51, SCRUB 53, WASH 55, PRE-STRIP 57, ELUTION 59, and RINSE 61, column steps. The order has been arranged to permit the more simplistic number and extent of secondary process lines, rather than a left-to-right or right-to-left progression of column steps.

For a multi-columnar device proceeding to connect the columns with each other in a step wise fashion, the ADSORPTION 51, SCRUB 53, WASH 55, PRE-STRIP 57, ELUTION 59, and RINSE 61, columnar steps of FIG. 3 can be referred to as zones. Further, several columns in parallel may be located within a single zone, especially where columnar progression would benefit from a longer residence time, etc. Additionally, each zone contains a designated number of columns each of which contain an adsorbent resin with chelating functionality. The number of columns in each zone depends on the kinetics of the mass transfer for each step of the process.

Although not shown on the drawings, each stream in FIG. 3 may be expected to be controlled and timed for tighter optimization. Further, control may be had based upon measuring any characteristic of any stream, including its pressure, temperature, acidity, redox potential, conductivity, pH, and more. A multi-port valve can be used to allocate the correct number of columns to each zone and direct fluids into and out of the resin bed columns. A multi-port valve (not shown) may implement the IX process by directing flows into and out of each step in the IX cycle in a manner whereby the relative resin flow is counter-current to the fluid flows through the resin columns. In terms of an actual realization of any of the column beds, flow through the resin beds can be either upflow or downflow in any specific zone. The choice of upflow and downflow is made with a view toward maintaining the columns free of any suspended solids that may accumulate in the resin beds when operating with flow in a single direction.

FIG. 3 illustrates a copper recovery system 101. The main flows into the system 101 include a feed PLS or mixed solvent stream 103 (which was seen in FIG. 1 flowing into the CIX recovery system 17). The mixed solvent stream 103 contains dissolved copper. An example of a typical feed may contain soluble copper in the range 100 mg/l to 6,000 mg/l and other (possibly unwanted) cations.

The mixed solvent feed liquor stream 103, which contains the copper to be extracted from a mixture of other cations, passes through an ADSORPTION 51 column (or adsorption zone among a number of columns) in which copper is selectively adsorbed onto the resin beds within ADSORPTION 51 column along with some unwanted iron and perhaps other impurities. Depending upon the copper concentration, the ADSORPTION 51 column resin beds may be configured as a single, fractional or multiple columns with possibly several counter-current stages of liquid-resin contact.

The copper depleted solution, also known as raffinate stream 105 passes out of the ADSORPTION 51 column and may be returned to the leaching process if the system 101 is located within an overall leaching system as was shown in FIG. 1. The details of the resin in any of the columns can be thought of as "resin flow" and is determined by the mass flow of copper in the mixed solvent feed liquor stream 103 and the capacity of the resin under the specific adsorption conditions. Put another way, if the resin in a given column is insufficient to handle the amount of copper to be adsorbed, the copper will "break through" and be lost into the raffinate stream 105. Likewise, if the amount of resin in a column is significantly longer than necessary to handle the amount of copper to be absorbed, a large amount of "non working" resin will be aged from being continually exposed to the various working chemicals to which the column is exposed.

However, where a multi-port valving system having a number of columns is used, such a system effectively move the resin (in the form of a series of columns) through each zone and from zone to zone. In such a system, resin flow can be thought of as being constant through all zones. Resin residence time in each zone depends on the number of resin beds allocated to each zone.

Next, the copper loaded resin moves out of adsorption zone and into the SCRUB 53 column or zone. In the SCRUB 53 column or zone the copper loaded resin is treated with a solution of sufficient reductive potential to convert iron loaded in the ADSORPTION 51 column step from the ferric form to the ferrous form and to back-extract it into the liquid phase. Again, resin beds in the scrub step are configured in a counter-current fashion and may use multiple stages of contact where several columns are involved in a zone or in a grouping of columns undergoing the same step.

The scrub feed liquor for input to the SCRUB 53 feed step may comes from several available sources, including in order of preference, effluent stream 107 from the WASH 55 column step (because this is essentially entrained scrub liquor); a portion of effluent stream 109 from the RINSE 61 column step (since this stream contains some acidic copper solution and no Fe); and also may come from the raffinate or the mixed solvent feed liquor stream 103. Further alternatives include a permeate (water) supply line 111 which is connected into a permeate tank 113 for temporary storage. Permeate water is water from which all minerals have been removed, and can be thought of as cation-free distilled water. Another possible source is diluted electrolyte from stream 115. These solutions and sources may be collected in a scrub feed tank (not shown) and form a stream 117 feeding the SCRUB 53 column or zone. The scrub feed stream 117 may first pass through a mixing reactor where it is treated with a suitable reducing agent. Shown in FIG. 3 is an $SO_2$ REDUCTANT TANK 119 which is configured to inject sulfur dioxide as a reducing agent into the feed stream 117.

The SCRUB 53 column step liquid effluent stream 121 contains the reduced iron (Fe2+) and is directed preferably to the adsorption zone feed liquor stream 103 or it can be sent directly into stream 105, with the raffinate. This may depend upon the iron content of the feed stream 103. Where the iron content is high, it may not be economic to suffer the collection and re-adsorption of iron in the ADSORPTION 51 column step even where it is possible to save more of the copper. Where the iron content is lower, a favorable equilibrium could permit re-introduction of the scrub effluent into the ADSORPTION 51 column step.

In terms of the $SO_2$ reducing agent, the system shown in FIG. 3 consumes little reducing agent and only that sufficient to remove the ferric ion loaded on the resin after adsorption.

A preferred embodiment may also have some copper content in the SCRUB 53 column feed so that displaced ferric ion is instantly replaced by copper and not replaced by hydrogen ion in the acidic scrub. SCRUB 53 column feed may preferably be in the range of from about 1.0<pH<2.0. A bed of small copper particles can be used to pre-treat the scrub feed stream 117 so that replacement copper ions will be instantly available. This small amount of soluble copper in reduced form would favor the replacement of iron on the resin with copper from solution.

Next, the resin from the SCRUB 53 step, loaded with copper generally washed free of iron, passes to the WASH 55 column step or zone. The WASH 55 step helps remove any acidic scrub still present from the SCRUB 53 step, but more importantly helps to further remove and isolate any residual iron present from the SCRUB 53 step.

The resin exiting the SCRUB 53 column or zone enters the WASH 55 column or zone. In a preferred embodiment of this invention the steps performed in the SCRUB 53 column and WASH 55 column zones can be combined to operate as a single step. WASH 55 column feed stream 111 is obtained from the permeate tank 113 and also from diluted electrolyte from stream 115.

Keep in mind that the process water or permeate tank 113 receives permeate from a first membrane system RO-1 through a stream 123 and from a second membrane system RO-2 through a stream 125. This recovery of water helps to maintain the water balance in the ELUTION 59 column step and creates suitable quality water for use in the WASH 55 column step and the RINSE 61 column step.

Generally, the PRE-STRIP 57 column step and the RINSE 61 column step, which occur immediately prior to and immediately after ELUTION 59 column step, require water that does not contain the cations normally present in the mixed solvent feed liquor stream 103. The membrane system permeates from membranes RO-1 and RO-2 already provide cation free solutions. The WASH 55 column or zone displaces residual scrub liquor from the column's resin beds. A wash feed stream 127 may be a combination of permeate from stream 111 and pre-strip effluent from stream 115.

Effluent from the WASH 55 column step may be sent to a scrub feed tank (not shown) and eventually into stream 117. The resin loaded with copper passes onto a PRE-STRIP 57 column water recovery step or zone. In this step, a portion of the eluate seen as a stream 129 from the ELUTION 59 column step, namely stream 131; and/or a portion of the effluent from the RINSE 61 column step, seen as stream 109, is introduced to the resin beds to displace any water entrained from the WASH 55 column step. This PRE-STRIP 57 column water recovery step serves to pre-strip the remaining Fe from the resin and prevent non-adsorbed impurities and dilution from leaking into the electrolyte to be produced in the subsequent ELUTION 59 column step or zone. The liquid effluent stream 115 from the PRE-STRIP 57 column water recovery step is directed to either the second membrane system RO-2, recycled to stream 127, or introduced into stream 117. The resin loaded with copper passes from the PRE-STRIP 57 column water recovery step to the ELUTION 59 step or zone.

In the ELUTION 59 column step, also known as the stripping step or zone the copper is desorbed from the solid phase into a liquid phase by a sufficiently strong acid solution seen as supplied by stream 133 which comes from the electro-winning system 21 which was previously seen in FIG. 1. One such eluent, typically a strongly acidic electrolyte is a stream used in the copper electro-winning system 21 seen in FIG. 1 in which the copper depleted electrolyte contains sulphuric acid and copper sulphate. The stream from the electro-winning system 21 which is depleted of copper is stream 133, while the stream leading into the electro-winning system 21 is stream 129, which is copper rich.

In the de-sorption process, of the ELUTION 59 column step hydrogen ion replaces copper ion on the resin bead chelating sites. The strong acid solution used in the de-sorption step is preferably recycled spent electrolyte from downstream copper electro-winning system 21 so that the complete copper recover operation can proceed in as closed loop form as possible.

This liquor channeled from the copper electro-winning system 21 contains a minimum pH 7 acidity in order to remove the copper from the adsorbent resin. A typical spent electrolyte stream 129 will contain between 80-200 grams per liter sulphuric acid and up to from about 15 to 30 grams per liter of copper ion.

The eluate in stream 129 is delivered to the downstream copper recovery step, for example copper electro-winning system 21. A portion of this eluate flow may be first used as feed to the previously described PRE-STRIP 57 column step as previously described.

The resin within a column which has been stripped of copper and passes from the ELUTION 59 column step into a RINSE 61 column step, also known as a rinse step. In the RINSE 61 column step, metal cation free water displaces any residual eluent which is present in the columns from the ELUTION 59 column step.

The feed streams for the RINSE 61 column step are expected to come mainly from the permeate tank, stream 111. A portion of the rinse may be provided from the ADSORPTION 51 step through a stream 135 which is shown separate and apart from stream 105, and may be referred to as sweetened raffinate. When the first portion of stream 103 is introduced into the adsorption-ready column during the ADSORPTION 51 step, the first liquid escaping the column is both copper and iron free, and is essentially rinse feed water. It is a high quality stream having characteristics similar to the permeate from permeate tank 113. Rather than allow this relatively pure stream to simply be dumped into the raffinate stream 105, if some mechanism were present to draw this initial stream away from the column, and only just enough of it so that it would insure that no copper nor iron had gotten through, such a water or permeate conservation measure would be had.

Since the volume of the column used will be known, the volume of the sweetened raffinate can be selected so that a constant amount can be drawn during each ADSORPTION 51 step to insure that no contaminants will be delivered to the RINSE 61 column step via stream 135. A conductivity meter placed in stream 135 can easily be used to detect the point at which column effluent is no longer suitable for use as a rinse material. A signal from such a meter could be employed to automatically control a valve switching arrangement. Any portion of stream 135 supplied during the RINSE 61 column step saves permeate which would otherwise be drawn through stream 111.

The effluent from the RINSE 61 column step seen as stream 133 may be supplied as needed to three other locations as seen in FIG. 3. Stream 109 can be supplied into stream 117, upstream of the SCRUB 53 column step, or into the column of the PRE-STRIP 57 column step, or to the second membrane system RO-2 to help create more permeate for stream 125, or optionally int stream 129.

The resin, once RINSE 61 step has been completed, is stripped of copper and rinsed and is ready to pass to the ADSORPTION 51 column step or zone at which point the resin cycle seen in FIG. 3 recommences.

In the system 101 water recovery steps are employed so as to minimize the load on the membrane systems. These are in evidence in streams 135, 109, 131, and a portion of stream 115 leading to stream 127 and 117. In addition effluents, including streams 115, 109, and 107 can be split on a timed or conductivity basis to further economize on the amount of permeate required for the overall process 101.

First membrane system RO-1 is used to generate permeate, of metal cation free acidic water. The feed to the first membrane system RO-1 is a fractional portion of the raffinate stream 105. The permeate created from the first membrane system RO-1 can be used as make up for the SCRUB 53 column step but is usually sent to the permeate tank 113 for use as feed to the WASH 55 column step & RINSE 61 column step. This first membrane system RO-1 membrane system is fed with a fraction of the raffinate stream 105 flow. Depending on the raffinate stream 105 ionic strength, the permeate recovery will range 40-60%. Membrane concentrate is returned to the stream of origin, raffinate stream 105, via a return stream 151 but downstream of the take-off point. In addition, a return stream 153 is provided between the raffinate stream 105 and the feed PLS or mixed solvent stream 103 for any situation in which a recycle stream is needed.

The second membrane system RO-2 is employed to remove water of dilution from the ELUTION 59 column step or zone product solution. Second membrane system RO-2 is fed with effluents from stream 115 and a portion of stream 109 produce an acidic permeate free of metal cations for use as feed into stream 125. Depending upon the ionic strength of the membrane feed permeate recovery will be between 45-75%. Membrane concentrate (17) is returned to the stream 129. In the industrial application of this invention it is anticipated that permeates from the either of the membranes systems may at times be used interchangeably in either solution recovery step.

Options for use of the $SO_2$ reductant include the use of either an in-line injection and mixing using liquid $SO_2$, or using a packed bed with solid media (such as copper solid particles). Other suitable reducing agents can also be used provided the economic benefit is stall favorable. For the SCRUB 53 column step to be effective the final oxidation-reduction potential of the solution must be less than less than the oxidation-reduction potential for converting $Fe_3^+$ to $Fe_2^+$. Any excess reductive capacity in the scrub effluent can usefully be used when this effluent is returned to the feed stream. The presence of at least a stoichiometrically equivalent amount of copper (equivalent to Fe on resin) in the SCRUB 53 column step is desirable since Fe displaced from the adsorbent can then be replaced by copper in an exchange of ions.

Where a multi-column switched valve device is used, the arrangement and timing of columns allocated to adsorption can be made a function of the copper and iron mixed solvent feed liquor stream 103. Analysis and sampling devices will be appropriately placed into the system 101 and will be based upon the storage capacity, switching controllability and other factors for each stream.

This process description is illustrative only and is not intended to limit the scope of the invention as defined by the appended claims. It will be apparent to those skilled in the art that various modifications and variations can be made in the methods of the present invention without departing from the spirit and scope of the invention. Thus, it is intended that the present invention cover modifications and variations of this invention provided they come within the scope of the appended claims and their equivalents.

What is claimed:

1. A continuous process for recovering at least one of copper and nickel comprising a sequential execution of steps to be performed utilizing a continuous ion exchange system having a plurality of vessels in communication with a multiple input-output valve device and which may include other steps interposed therebetween and comprising the steps of:
   actuating said multiple input-output valve device to bring acidic liquors that contain copper into at least a first one of said plurality of vessels;
   adsorbing at least one of copper and nickel from acidic liquors with pH in the range of from 0.5 to 3.0 that contain said at least one of copper and nickel cation using a chelating adsorbent resin in said at least a first one of said plurality of vessels;
   producing at least one of a lowered copper raffinate and a lowered nickel raffinate: and further comprising the step of extracting said metal cation free water from a membrane system using at least one of said lowered copper raffinate and said lowered nickel raffinate and an effluent from said rinsing said resin step:
   actuating said multiple input-out-put valve device to bring a cation free aqueous solution into at least a second one of said plurality of vessels;
   treating said chelating adsorbent resin of said at least a second one of said plurality of vessels with said cation free aqueous solution, to remove any ferric and ferrous ions but insufficient to significantly strip adsorbed copper or nickel from said resin;
   actuating said multiple input-output valve device to bring a stripping solution of sufficient strength to produce at least one of a copper and nickel elute product into at least a third one of said plurality of vessels;
   stripping said adsorbed copper or nickel from said resin by introducing said stripping solution of sufficient acid strength into said at least a third one of said plurality of vessels to produce at least one of a copper and nickel elute product;
   actuating said multiple input-output valve device to bring a bring a rinsing solution into at least a fourth one of said plurality of vessels;
   rinsing said resin within said at least a fourth one of said plurality of vessels with said rinsing solution to increase a pH value within said resin to condition said resin for said adsorbing copper or nickel from acidic liquors step;
   and, wherein said at least a first, second, third, and fourth one of said plurality of vessels experience their sequence of internal steps above simultaneously.

2. The process for recovering least one of copper and nickel as recited in claim 1 wherein said treating said chelating adsorbent resin with said cation free aqueous solution, to remove any ferric and ferrous ions but insufficient to significantly strip adsorbed cooper or nickel from said resin step is performed by contacting said resin with a solution of at least one of copper mixed solvent, electrolyte, and permeate, and wherein said solution is treated with a reducing agent.

3. The process for recovering least one of copper and nickel as recited in claim 2 wherein said reducing agent is $SO_2$.

4. The process for recovering least one of copper and nickel as recited in claim 1 wherein said membrane system efficiently excludes cationic species other than $H^+$.

5. The process for recovering least one of copper and nickel as recited in claim 1 wherein said reducing said chelating adsorbent resin, to an extent which will reduce any ferric ion to ferrous ion and remove said ferric and ferrous ion from said resin but insufficient to significantly strip adsorbed copper and adsorbed nickel from said resin step is performed with a reducing agent, and further comprising the step of washing said resin, after said reducing said chelating adsorbent resin, to an extent which will reduce any ferric ion to ferrous ion and remove said ferric and ferrous ions from said resin and replace at least one of said copper and nickel in place of the removed said ferric and ferrous ions but insufficient to significantly strip at least one of adsorbed copper and adsorbed nickel from said resin step with a metal-cation free water in order to displace residual reducing agent.

6. The process for recovering least one of copper and nickel as recited in claim 1 wherein said stripping solution includes a copper electrolyte return from an electro-winning operation.

7. The process for recovering least one of copper and nickel as recited in claim 1 wherein said rinsing said resin to increase a pH value within said resin is performed using a metal cation free amount of water.

8. The process for recovering least one of copper and nickel as recited in claim 1 wherein a first portion of an effluent from said adsorbing at least one of copper and nickel from acidic liquors step is used in said rinsing said resin to increase a pH value of said resin step.

9. The process for recovering least one of copper and nickel as recited in claim 1 and further comprising the step of washing said reduced said chelating adsorbent resin.

10. The process for recovering at least one of copper and nickel as recited in claim 9 and further comprising the step of contacting said at least one of said adsorbed copper resin and adsorbed nickel resin prior to said stripping said adsorbed copper from said resin step, by introducing a pre-strip solution of at least an effluent from said rinse step and an effluent from said stripping at least one of said adsorbed copper and said adsorbed nickel from said resin step.

11. The process for recovering least one of copper and nickel as recited in claim 1 wherein said rinsing said resin to increase a pH value within said resin is performed with a permeate solution.

12. The process for recovering least one of copper and nickel as recited in claim 1 wherein said chelating adsorbent resin is a solid stationary phase having a functional group selective for at least one of copper and nickel over iron and other cations.

13. The process for recovering least one of copper and nickel as recited in claim 1 wherein said chelating adsorbent resin is porous and impregnated with suitable extractant with selectivity for copper.

14. The process for recovering least one of copper and nickel as recited in claim 1 wherein copper recovery is desired and wherein said chelating adsorbent resin is a chloro-methylated macroporous styrene-divinylbenzene bead functionalized with hydroxypropyl picolylamine.

15. The process for recovering least one of copper and nickel as recited in claim 1 wherein said chelating adsorbent resin is a picolyl chloride immobilized on a silica-amine solid porous phase.

16. The process for recovering least one of copper and nickel as recited in claim 1 wherein said chelating adsorbent resin has a loading capacity in the range of 12 to 45 grams copper per liter of wet settled resin.

17. The process for recovering least one of copper and nickel as recited in claim 1 wherein said cation free aqueous solution used in said treating chelating adsorbent resin step is dosed with a reducing agent.

18. A continuous process for recovering at least one of copper and nickel comprising a sequential execution of steps which may include other steps interposed therebetween and comprising the steps of:
  adsorbing at least one of copper and nickel from acidic liquors with pH in the range of from 0.5 to 3.0 that contain said at least one of copper and nickel cation using a chelating adsorbent resin to produce at least one of lowered copper raffinate and a lowered nickel raffinate, respectively;
  reducing said chelating adsorbent resin, to an extent which will reduce any ferric ion to ferrous ion and remove said ferrous ion from said resin but insufficient to significantly strip adsorbed copper or nickel from said resin;
  stripping said adsorbed copper or nickel from said resin by introducing said stripping solution of sufficient acid strength to produce a copper or a nickel elute product;
  rinsing said resin to increase a pH value within said resin to condition said resin for said adsorbing copper or nickel from acidic liquors step and repeating the above sequence of steps beginning with said adsorbing copper from acidic liquors step; and
  extracting said metal cation free water from a first membrane system using at least at least one of said lowered copper raffinate and said lowered nickel raffinate, respectively; wherein said first membrane is an engineering membrane of polymeric construction and resistant to acidic conditions.

19. The process for recovering least one of copper and nickel as recited in claim 18 and further comprising the step of extracting said metal cation free water from a second membrane system using an effluent from said rinsing said resin step.

* * * * *